July 18, 1961  H. P. BOVENKERK  2,992,900
METHOD FOR PRODUCING IMPROVED DIAMOND CRYSTALS
Filed Dec. 29, 1958
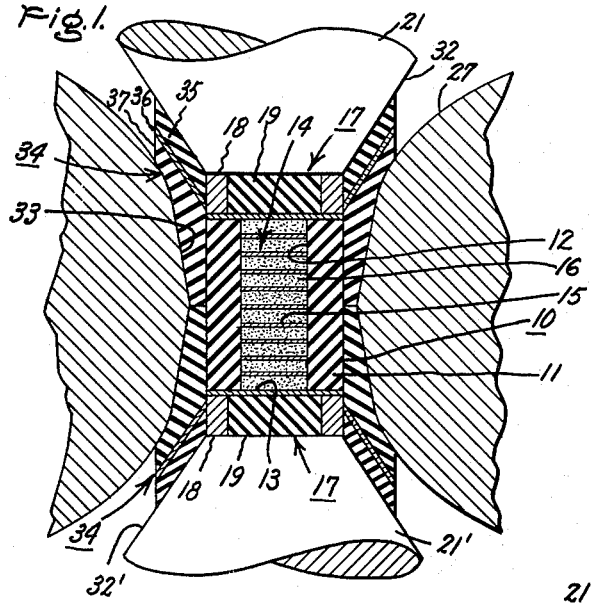
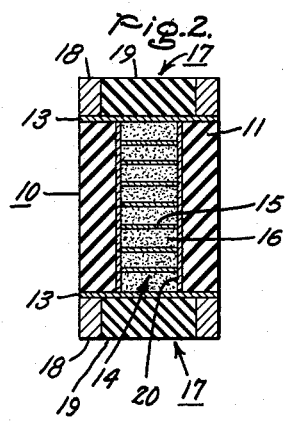
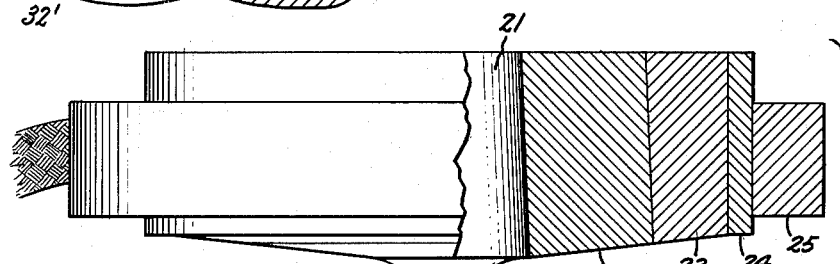
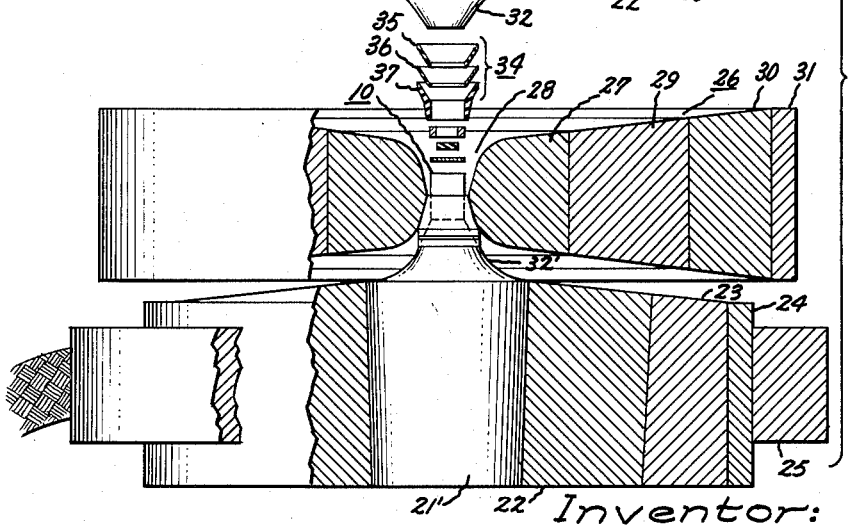
Inventor:
Harold P. Bovenkerk,
by Joseph T. Cohen
His Attorney.

United States Patent Office 2,992,900
Patented July 18, 1961

2,992,900
METHOD FOR PRODUCING IMPROVED DIAMOND CRYSTALS
Harold P. Bovenkerk, Saratoga, N.Y., assignor to General Electric Company, a corporation of New York
Filed Dec. 29, 1958, Ser. No. 783,596
6 Claims. (Cl. 23—209.1)

This invention relates to an improved method and apparatus employed to produce superior diamond crystals and more particularly, to a reaction vessel configuration which provides controlled growth of individual diamond crystals.

One method of producing, forming, or growing diamond crystals, or the transition of non-diamond carbon or carbonaceous material from the non-diamond form to the diamond form has been disclosed in a copending application Serial No. 707,435, H. T. Hall et al., filed January 6, 1958, and assigned to the same assignee as the present invention, now U.S. Patent 2,947,610, and the apparatus employed to obtain the diamond transition conditions of temperature and pressure has been disclosed in a copending application to H. T. Hall, Serial No. 707,-432, filed January 6, 1958, and assigned to the same assignee as the present invention, now U.S. Patent 2,941,-248. The word "grow" will hereafter be employed by way of example as a general term and includes not only the aforementioned equivalent words but also is intended to include generally means by which diamonds are produced. Diamonds produced by the above Hall et al. method and Hall apparatus generally grow or form in a cluster configuration which requires subsequent separation methods to provide individual crystals. Such cluster formation inhibits in most instances the growth characteristics of individual crystals while, at the same time, the diamonds so grown tend to show many surface irregularities as well as substantial inclusions of foreign matter. Therefore, by controlling the rate of growth of diamond crystals and providing environmental spaciousness for individual crystal growth, a much improved diamond is obtained.

It is, therefore, an object of this invention to provide an improved process of growing diamonds.

It is another object of this invention to provide improved reaction vessel specimen and catalyst arrangement for diamond growth.

It is another object of this invention to provide improved and superior individual diamond crystals.

It is yet another object of this invention to provide individual and larger single diamond crystals.

Briefly described in one form, this invention includes a reaction vessel configuration which contains a material from which diamond is grown together with a catalyst, the two materials being provided in plural surface or laminate form and alternately superimposed upon each other to provide a greater surface area and controlled volume for the growth of diamond under more desirable conditions.

This invention will be better understood when taken in connection with the following descriptions and the drawings in which:

FIG. 1 is one preferred form of the reaction vessel of this invention, including the sample therein, and positioned in a press apparatus;

FIG. 2 is a modified form of the reaction vessel and its contents of FIG. 1;

FIG. 3 is one form of apparatus which may be utilized to provide the necessary pressures and temperatures in the reaction vessels of FIGS. 1 and 2.

Referring now to FIG. 1, there is illustrated one preferred form of a reaction vessel 10 with its contents arranged in accordance with the teachings of this invention.

The drawing of FIG. 1 may be considered as being one preferred form to approximate scale. The specific dimensions and proportion, however, are flexible to the extent of adaptability to various chambers of suitable high pressure apparatus, such as presses and the like. Reaction vessel 10 comprises a cylinder 11 of pyrophillite, catlinite or other electrically nonconductive stone like or ceramic material of similar characteristics, which, for example, will undergo controlled or confined compression to the extent of 100,000 atmospheres or greater without undue spalling or loss of electrically nonconductive characteristics, and yet retain the ability to transmit high pressures in a generally hydrostatic manner. The hollow central section 12 of cylinder 11 is closed off at each end by a cover-like or disc element 13 of an electrically conductive material. The sample material indicated broadly as 14 is in the form of relatively thin discs 15 of a suitable catalyst and similar discs 16 of non-diamond carbon from which diamonds may be grown. These discs 15 and 16 are arranged alternately in stacked relationship within cylinder 11, and cover-like discs 13 placed at each end of the cylinder 10 to conclude the reaction vessel containing the specimen. For a somewhat permanent assembly, discs 13 may be conveniently cemented, for example, by a water glass cement or attached by suitable mechanical means to the cylinder 11 to maintain the illustrated relationship. While the preferred form of this invention describes the diamond material and the catalyst as disc-like shapes, it is understood that the arrangement may take a form other than disc-like, such as sheet, ribbon, or a broadly contemplated lamina arrangement.

An end cap assembly 17 is provided for reaction vessel 10 and comprises an electrically conductive ring 18 and a plug or disc 19 of the same material as cylinder 11. However, other or modified end caps and also reaction vessels may be employed, for example, those as illustrated and described in my copending application Serial No. 647,425, Bovenkerk, filed March 20, 1957, and assigned to the same assignee as the present invention, now U.S. Patent 2,941,252, and be within the scope of the present invention.

The term "catalyst" as used in this application may best be termed a diamond catalytic material and includes a range of metals which act as a catalyst to the diamond growing process much in the same manner as the term and use of a "catalyst" is employed broadly in the field of chemical reactions. Metals which have been found to display the essential characteristics of a catalyst in a diamond growing process and which are in reference to and included in the term "diamond catalytic material" are the metals of group VIII of the periodic table of elements, chromium, manganese, tantalum, and alloys thereof.

The material from which diamond is grown, in its essence is a non-diamond form of carbon, broadly a carbonaceous material or generally a carbon containing material. It is to be understood that the growth of a diamond from a non-diamond carbon material is not entirely dependent upon the degree, quality, and amount of carbon present in the material but more so to the feature that the material contains carbon under conditions whereby it may be subjected to the pressures and temperatures involved and may be acted upon with a catalyst as previously defined.

The multiple disc arrangement as a preferred form of this invention not only provides a far greater surface area than previously employed or arranged reaction vessel specimens, but also provides more favorable diamond growing conditions applicable to various types of reaction vessels. In addition, it is important to provide proper and sufficient surface areas and to arrange areas and volumes to provide optimum crystal growth conditions. Growth of diamonds has been observed to occur at the interface of the diamond material and the catalyst and to grow from the catalyst surface into the diamond material surface. The diamond material disc thickness should, therefore, be sufficient to the extent that the thickness after compression remains great enough so that diamond growth into the diamond material may take place from either side of the catalyst and without interference from each other. The catalyst discs are not particularly restrictive in thickness, but are chosen of such a thickness to retain their identity under operative conditions. A thickness of about 0.020 inch for the catalyst discs and 0.100 inch for the specimen discs give excellent results in this invention.

The thickness of the specimen is a determining factor in crystal size since, as before mentioned, preferred growth conditions should be established to permit diamond growth from each catalyst specimen interface into the specimen without interference by crystal growth growing oppositely. The diameter of the discs and the length or height of the stack may be varied to conform to other reaction vessel configurations. Good results are obtained when about 14 discs of catalyst and 15 discs of specimen are employed with the first and last disc or the top and bottom disc being a catalyst disc in conjunction with being employed as the cover disc 13.

It has been discovered that improved results are obtained in the process of this invention when the catalyst employed is an alloy or alloys of the diamond catalytic metals mentioned. While satisfactory results are obtained with the use of non-alloy catalyst, in some circumstances, they tend in the molten condition to migrate through the non-diamond carbon material. An alloy, among other advantages, exhibits or permits the use of lower temperatures and accordingly lower pressures during the diamond operation. For this reason, and the exhibited tendencies of an alloy to be less mobile in the molten state, the sample geometry remains quite stable under operating conditions.

Alloys used as catalysts may be categorized in three types. The first type includes alloys composed exclusively of the catalyst elements such as alloys of the metals of group VIII of the periodic table of elements, chromium, manganese, and tantalum. The basic action of the alloy is similar to that of the elements themselves, except for the temperature range over which they are operative as catalysts.

The second type of alloy catalyst includes alloys having a non-catalyst metal as an alloying addition. Examples of this are nickel and aluminum, iron and molybdenum, and nickel and copper. The alloying ingredient may or may not lower the melting point below the base metal and the action is then one of catalyst dilution. No particular advantage of catalyst dilution has been apparent from the use of them for diamond synthesis.

A third type of alloy catalyst are those including an elemental catalyst metal and one or more of the strong carbide forming elements. These carbide forming elements are such metals as titanium, zirconium, boron, silicon, vanadium, chromium, iron, manganese, and tungsten. Most of the strong carbide forming elements are not catalysts in themselves. However, manganese, chromium, cobalt and iron are carbide formers and also are elemental catalysts.

The action of the alloys containing carbide formers appears to consist of two effects. The first is that of lowering the melting point such as may occur with 100 percent catalyst alloys. A second effect is the apparent increase in the catalytic reaction to grow diamond from non-diamond carbon, e.g., graphite, when a strong carbide forming element is present. The action of forming the metal carbide stimulates the diamond reaction in a manner that is not understood at the present time.

The carbide forming reaction is a strong one If seed diamonds are placed in contact with the strong carbide formers, even at pressures and temperatures in the diamond stable region, the carbide will be formed at the expense of the diamond even though other carbon sources are present. This action is observed also in growing diamonds with a carbide forming substrate, i.e., a carbide former metal layer beneath and adjacent a non-carbide forming layer, or an alloy containing a high percentage of carbide forming alloy. The diamonds grown under these conditions will be dissolved away where the concentration of the carbide former is greatest, leaving partial crystals. Since the catalyst elements such as iron, cobalt and manganese tend to form carbides when used as catalysts in their elemental form, this competing reaction with the diamond formation reaction makes the use of these elements in their elemental form undesirable in the growth of exceptionally larger and better crystals. In growing improved single crystals of diamond, therefore, it is important to use only a small amount of carbide former either as an alloying element or substrate. Employing other alloying elements, however, to reduce this carbide forming reaction permits consistent diamond reactions using these base metals. With increased temperature and geometry stability in combination with the lower pressures and temperatures, fewer diamond nuclei tend to form so that the growth mechanism involved is concentrated on fewer diamonds and consequently these diamonds are not only better formed but also to a considerable extent are larger. The overall combination as described in conjunction with the increased surface area, however, greatly increased the total yield of good crystals over prior processes and types of apparatus. In each instance, the particular alloy employed defines generally the corresponding pressures and temperatures.

Accordingly, in order to provide the larger, better formed and superior diamond crystal, it has been discovered that, in addition to the sample geometry as described, alloy catalysts are preferred over metal catalysts in their elemental form. Furthermore, where the alloy contains a carbide former to stimulate the diamond reaction and not to detract therefrom, a much improved diamond crystal is obtained.

A few of the alloys which may be employed in this invention include, for example, nickel-chrome, nickel-iron, nickel-platinum, nickel-cobalt, etc. Further reference may be made to a copending application Serial No. 707,433, Strong, filed January 6, 1958, and assigned to the same assignee as the present invention, now U.S. Patent 2,947,609, for additional and more particular alloy disclosures and teachings.

When an alloy is employed the diamond growing temperature and pressure is reduced below those temperatures and pressures associated with the individual metals of the alloy where one or both are catalysts. This reduction in pressure and temperature is important to the overall combination control of the reaction. For example, when using nickel as a catalyst the pressure is about 75,000–80,000 atmospheres, and the temperature is about 1500–1600° C., and when an 80 percent nickel 20 percent chrome alloy is used the pressure is about 70,000–75,000 atmospheres and the temperature about 1400–1500° C. Better results are obtained in the intermediate range, for example, at about 75,000 atmospheres and 1500° C., when an alloy is used and this is applicable to alloys in general as compared to elements. Various combinations may be employed to reduce the pressure to as low as about 50,000 atmospheres and temperatures as low as about 1300° C.

FIG. 2 is a modification of this invention which is adaptable to electrical heating by a variation of the resistance type and which may be effectively employed with the invention as illustrated in FIG. 1. In FIG. 2, cylinder 11, closure 13, and end cap 17, are similar to the corresponding structure in FIG. 1. The discs 15 and 16 are made smaller in diameter in order that they may be surrounded by an electrically conductive cylinder 20, for example, graphite. In this manner, current flow through cylinder 19 will partially indirectly heat the sample material for increased temperature control.

FIG. 3 is illustrative, in one approximate proportion and size, of one form of apparatus which may be employed to provide the proper conditions for diamond growth in accordance with the teachings of this invention. Various other means may be so employed, FIG. 3 being one example described and claimed in the aforementioned copending application Serial No. 707,432, H. T. Hall, U.S. Patent 2,941,248. In FIG. 3 the apparatus disclosed is intended to be employed between a pair of force members, such as pistons or the like as found, for example, in a large press, not shown. Briefly described the apparatus comprises a pair of punches 21 and 21' of a very hard material, such as, for example, tool steel or cemented tungsten carbide, one or both of which may be movable towards the other. Added strength to the punches is obtained by means of press fit binding rings 22, 23, 22' and 23' of hard steel which are pressed or shrunk fitted according to mechanical design practices to withstand maximum pressures. An additional soft steel ring 24 encircles the binding rings to act as a safety ring and an electrical conductor ring 25 surrounds safety ring 24. Between and concentric with punches 21 and 21' is positioned a belt assembly 26 which includes a die member 27 having a convergent divergent wall opening 28 therethrough. Die member 27 is surrounded by plurality of binding rings 29, 30 and 31 in the same manner and for the same purposes as described for the rings 22, 23 and 24 of punches 21 and 21'. In one form of this apparatus the punches 21 and 21' have opposed tapering surfaces 32 and 32' of approximately 30° to the vertical, with a final smooth and continuous curve tapering away from the punch face a few degrees above the horizontal as illustrated. The convergent divergent wall of opening 28 is at an angle of about 11° to the vertical to also taper or curve in a smooth continuous surface outwardly to a few degrees above the horizontal.

Referring again to FIG. 1 which is an enlarged section of FIG. 3, the punches 21 and 21' together with the die member 27 define a reaction chamber 33 in which the reaction vessel 10 of this invention is placed. A gasket assembly 34 is utilized to maintain the pressure in reaction vessel 10 and/or to seal the reaction vessel in the chamber. A preferred gasket assembly includes for each punch 21 and 21', a frusto-conical gasket 35 positioned concentrically on the tapered surface 32 of each punch 21 and 21', a soft iron frusto-conical gasket 36 positioned concentrically on gasket 35, and further substantially frusto-conical gasket 37 positioned concentrically on gaskets 36 and extending into the reaction chamber 33 to meet in abutting relationship. Gaskets 35 and 37 are of the same material as cylinder 11 of reaction vessel 10 as previously described. An expanded view of the gaskets and reaction vessel is illustrated in FIG. 3.

Pressure in the reaction vessel is obtained by movement of one or both of the punches 21 and 21' against the reaction vessel 10. With reference to FIG. 3, temperatures are provided by electrical heating which includes suitable electrical conductors 25 connected to punches 21 and 21' and to a source of power, not shown. Current flow is through the punches, for example, through rings 24, 23 and 22 to punch 21, then to ring 18 of reaction vessel 10, closure disc 13, thence through the conductive discs 15 and 16 (FIG. 1) for resistance heating, or through tube 20 (FIG. 2), for partial indirect electrical heating. The circuit is completed through lower disc 13, ring 18, punch 21', rings 22, 23' and 24' to lower conductor 25'.

It is to be understood that the above-described apparatus is but one of numerous means which may be employed to provide high pressures and high temperatures and that broadly speaking, suitable pressure vessels or autoclaves may be generally employed to provide the required conditions.

A great number of tests have been carried out in accordance with the teachings of this invention with wide variation in time, temperature, pressure, catalysts, and other operating parameters. Exemplary tests and the results thereof are given in the following examples:

EXAMPLE 1

Reaction vessel 10 as illustrated in FIG. 1 was assembled with 14 graphite discs of spectroscopic purity and about 0.100 inch thick together with 15 catalyst discs of about 0.020 inch thick. The catalyst disc material was an alloy of 35 percent nickel and 65 percent iron. The vessel was then placed in the apparatus of FIG. 3 and a pressure of approximately 70,000 atmospheres imposed. Current was then caused to flow through the reaction vessel until the temperature reached 1450° C. Pressure and temperature conditions were maintained stabilized for about 10 minutes, after which, the temperature was reduced and pressure released. The reaction vessel was removed from the press apparatus and the sample material carefully preserved and subjected to a fuming nitric acid treatment at 300° C. to remove the formed diamonds from their matrix.

EXAMPLE 2

Reaction vessel 10 as illustrated in FIG. 1 was assembled with 9 graphite discs of spectroscopic purity and about 0.100 inch thick together with 10 catalyst discs of about 0.020 inch thick. The catalyst disc material was an alloy of nickel and chromium 80 percent nickel and 20 percent chromium. The vessel was then placed in the apparatus of FIG. 3 and a pressure of approximately 75,000 atmospheres imposed. Current was then caused to flow through the reaction vessel until the temperature reached 1500° C. Pressure and temperature conditions were maintained stabilized for about 15 minutes, after which, the temperature was reduced and pressure released. The reaction vessel was removed from the press apparatus and the sample material carefully preserved and subjected to a fuming nitric acid treatment at 100° C. to remove the formed diamonds from their matrix.

The above examples were repeated many times employing temperatures in the general range of 1400–1600° C., pressures in the range of 65,000–80,000 atmospheres, duration times in the range of a few seconds to 90 minutes, alloy catalysts including (on a weight basis), for example, an alloy of nickel 72 percent, iron 6–10 percent, chromium 14–17 percent; an alloy of 80 percent nickel, 20 percent iron; and an alloy of 65 percent iron and 35 percent nickel, etc.; and graphite in the purity range of 99–99.9 percent carbon.

In all examples and tests, diamonds of exceptional quality were grown and quality control analyses were performed indicating that true diamonds were obtained. While the most important diamond test is the X-ray diffraction test, other tests were also performed. These X-ray diffraction patterns, which are employed by the foremost authorities in diamond technology in identifying diamonds, were obtained from diamonds prepared in the above examples by taking a Debye Scherrer photograph in a cylindrical camera of 5 centimeters radius with a $CuK_a$ radiation. Interplanar spacings ($d$ in Angstrom units) measured from these photographs are compared with the theoretical value for diamonds in the table below.

*Table 1*

| Plane | Measured | Theoretical |
|---|---|---|
| 111 | 2.05 | 2.060 |
| 220 | 1.26 | 1.262 |
| 311 | 1.07 | 1.076 |
| 400 | 0.89 | 0.8920 |
| 331 | 0.82 | 0.8185 |

The diamonds formed by the process of this invention were also analyzed for carbon by microcombustion. Results showed that diamonds of this invention exceeded 99 percent carbon while the known content of natural diamonds is from 80–100 percent.

Scratch tests were also performed with diamonds of this invention and it was found that diamonds of this invention scratch natural diamonds.

Furthermore, density tests were performed on the diamonds grown from this invention by the standard chemical test of sinking and floating within a known density medium. Density of a natural diamond is about 3.5 grams per cubic centimeter. The density of diamonds taken from the sample of this invention was also found to be about 3.5 grams per cubic centimeter.

As will be apparent to those skilled in the art, the objects of my invention were obtained by the use of an improved reaction vessel and plural configurations of alternate catalyst and diamond material to provide more favorable conditions such as, for example, temperature distribution, growth rate, and sample geometry stability for diamond growth, and resulting in diamonds of improved quality and size. The reaction vessel of this invention is contemplated as the means to provide similar results for other reactions of other materials where increased surface area is desired or for general separation of various materials under high pressure, high temperature conditions.

While other modifications of this invention and variations of apparatus and method have not been described, the invention is intended to include all such as may be embraced in the following claims.

What I claim as new and desire to secure by Letters Patent of the United States is:

1. In the synthesis of diamond in a reaction chamber in a high pressure high temperature apparatus which includes subjecting a combination of a non-diamond form of carbon and a diamond catalytic material to sufficiently high pressures and high temperatures to obtain a transition from the non-diamond form of carbon to diamond, the process comprising positioning a plurality of lamina of non-diamond carbon in said reaction chamber, positioning a plurality of diamond catalytic material lamina in said reaction chamber, arranging said catalyst and said carbon lamina in alternate laminar relationship, subjecting said combination of non-diamond carbon and diamond catalytic material to a combined pressure and temperature in the reaction chamber sufficient to cause diamond growth from said non-diamond carbon, and recovering the diamonds formed.

2. The invention as described in claim 1 wherein said metal catalytic diamond material includes a metal taken from the class consisting of the metals of group VIII of the periodic table of elements, chromium, manganese, and tantalum.

3. The invention as described in claim 2 wherein said metal diamond catalytic metal is an alloy including a metal taken from a group consisting of the metals of group VIII of the periodic table of elements, chromium, manganese and tantalum.

4. In the synthesis of diamond in a reaction chamber in a high pressure high temperature apparatus which includes subjecting a combination of non-diamond form of carbon and a diamond metal catalytic material to sufficiently high pressures and temperatures to obtain growth of diamond from the non-diamond form of carbon, the process comprising positioning a plurality a diamond catalytic metal alloy discs and a plurality non-diamond carbon discs in said vessel, arranging said catalyst discs and said carbon discs alternating in stacked relationship, applying a pressure in the approximate range of 50,000–90,000 atmospheres, raising the temperature to the approximate range of 1300–1800° C., maintaining said pressure and said temperature from approximately a few seconds to 90 minutes, reducing the pressure and temperature and recovering diamonds formed in said vessel.

5. The invention as described in claim 4 wherein said diamond catalytic metal is an alloy which includes a metal taken from the group consisting of the metals of group VIII of the periodic table of elements, chromium, manganese and tantalum, and wherein said non-diamond carbon is graphite of spectroscopic purity.

6. In the synthesis of diamond in a high pressure high temperature apparatus which includes subjecting a combination of a non-diamond form of carbon and a diamond catalytic material to sufficiently high pressures and high temperatures to cause diamond growth from said non-diamond form of carbon, the process comprising employing a reaction vessel having an aperture therein, inserting an electrically conductive sleeve within said reaction vessel aperture in contiguous relationship with said vessel, positioning a plurality of diamond metal catalytic material lamina and a plurality of non-diamond carbon lamina in said sleeve where said lamina are concentric with said sleeve in contiguous relationship therewith, arranging said diamond catalytic material lamina and said carbon lamina in alternating stacked relationship, heating said combination by the passage of electric current through said sleeve, subjecting said combination to pressures and temperatures sufficient to cause diamond growth from said non-diamond carbon lamina, and recovering the diamonds formed.

References Cited in the file of this patent

UNITED STATES PATENTS

| | | |
|---|---|---|
| 411,017 | Edison | Sept. 17, 1889 |
| 682,249 | Frank | Sept. 10, 1901 |
| 1,637,291 | Barnett | July 26, 1927 |
| 2,084,002 | Peterson | June 15, 1937 |
| 2,149,596 | Gillett et al. | Mar. 7, 1939 |
| 2,547,521 | Buehler | Apr. 3, 1951 |
| 2,554,499 | Poulter | May 29, 1951 |
| 2,814,552 | Van Dijck | Nov. 26, 1957 |

OTHER REFERENCES

Ray et al.: Physics and Chemistry of the Earth, vol. 1, pages 144, 145, Pergamon Press, London (1956).

Hall, The Review of Scientific Instruments, vol. 29, pages 267–269, 271, 272. April 1958.